United States Patent [19]

Shimo et al.

[11] Patent Number: 5,433,527
[45] Date of Patent: Jul. 18, 1995

[54] ROLLING GUIDE UNIT WITH ELASTIC MEMBER

[75] Inventors: Takahiro Shimo; Takehiko Hara, both of Kanagawa; Yukio Yoshioka, Saitama; Toshiaki Geka, Chiba, all of Japan

[73] Assignee: Nippon Thompson Co., Ltd., Tokyo, Japan

[21] Appl. No.: 136,100

[22] Filed: Oct. 14, 1993

[30] Foreign Application Priority Data

Oct. 14, 1992 [JP] Japan ............... 4-077804 U
Aug. 6, 1993 [JP] Japan ............... 5-047211 U

[51] Int. Cl.⁶ ............................................. F16C 29/06
[52] U.S. Cl. ............................................. 384/45; 384/54
[58] Field of Search ................ 384/43, 44, 45, 49, 384/54

[56] References Cited

U.S. PATENT DOCUMENTS

| | | | |
|---|---|---|---|
| 3,341,262 | 9/1967 | Kalmanek | 384/44 |
| 3,704,919 | 12/1972 | Titt | 384/44 |
| 4,240,673 | 12/1980 | Ernst et al. | 384/44 |
| 4,421,363 | 12/1983 | Olschewski et al. | 384/45 X |
| 4,730,945 | 3/1988 | Luther et al. | 384/45 |
| 5,161,896 | 11/1992 | Hëfling et al. | 384/44 X |

FOREIGN PATENT DOCUMENTS 4140042 6/1993 Germany ............... 384/44

*Primary Examiner*—Thomas R. Hannon
*Attorney, Agent, or Firm*—Sughrue, Mion, Zinn, Macpeak & Seas; Richard C. Turner; Marc Kaufman

[57] ABSTRACT

A rolling guide unit that inhibits noise and vibrations is described. The above-mentioned advantage is obtained by providing an elastic member at a prescribed site on at least one of either a rolling element or rolling element circulating path in which said rolling elements roll so as to make contact with the other.

6 Claims, 22 Drawing Sheets

ROLLING GUIDE UNIT WITH ELASTIC MEMBER

BACKGROUND OF THE INVENTION

1. Field of the Invention

The present invention relates to a rolling guide unit that guides an object to be moved, and which is equipped on, for example, a machine tool or industrial robot.

2. Description of the Prior Art

An example of this type of rolling guide unit of the prior art is the rolling guide unit shown in FIGS. 1 and 2.

As shown in the drawings, said rolling guide unit has track rail 1, in which tracks in the form of a pair of track grooves 1a are formed in both the right and left sides along the lengthwise direction, a slider in the form of sliding unit 3 having rolling element circulating path 2 (to be later described in detail) and able to move relative to said track rail 1, and a plurality of rolling elements in the form of balls 4, that bear the load between track rail 1 and sliding unit 3 by circulating while rolling over the above-mentioned track grooves 1a accompanying movement of sliding unit 3, and which are arranged and contained within said rolling element circulating path 2.

Sliding unit 3 has casing 6, provided so as to stride over track rail 1, a pair of end caps 7a and 7b coupled to both front and back ends of said casing 6, and two seals 8a and 8b attached on each of the outer surfaces of said end caps 7a and 7b. Furthermore, grease nipple 9 is attached to end cap 7a for supplying grease to the above-mentioned balls 4. As shown in FIG. 2, rolling element circulating path 2 is composed of load bearing track groove 2a, namely a load bearing track, and return path 2b, formed linearly and in parallel with each other in casing 6, and a pair of roughly semicircular direction changing paths 2c and 2d formed in both end caps 7a and 7b that connect said loading bearing track groove 2a and return path 2b at both their ends. Furthermore, the above-mentioned load bearing track groove 2a corresponds to track groove 1a of track rail 1. In addition, in FIG. 1, reference numerals 11 and 12 indicate retaining members that prevent balls 4 from falling out of the above-mentioned load bearing track groove 2a when sliding unit 3 is removed from track rail 1.

The rolling guide unit having the above-mentioned constitution is arranged on, for example, the bed of a machine tool (not shown), and track rail 1 is fastened to said bed with bolts (not shown). A table for holding a workpiece and so forth (not shown) is bolted to sliding unit 3, and this operates in the form of the moving side. Namely, said table is moved back and forth by a driving device (not shown) with a workpiece and so forth placed on top of said table. Furthermore, as shown in FIG. 1, a plurality of bolt insertion holes 1b are formed in track rail 1 in which bolts are inserted for fastening to the above-mentioned bed and so forth. In addition, a plurality of threaded holes 6a are formed in the upper surface of casing 6 of sliding unit 3. The above-mentioned table is fastened to sliding unit 3 by bolts (not shown) screwed into these threaded holes 6a.

In the rolling guide unit described above, although sliding unit 3 moves smoothly as a result of balls 4 rolling over track groove 1a while circulating within rolling element circulating path 2, this constitution has the disadvantage of the movement of balls 4 producing noise and vibrations. Particularly when balls 4 move into load bearing track groove 2a from direction changing path 2c or 2d of rolling element circulating path 2, said balls 4 collide with the track surface of track groove 1a. Conversely, when balls 4 move from said load bearing track groove 2a into direction changing path 2c or 2d, said balls 4 collide with the inside wall surfaces of the connecting portions of said load bearing track groove 2a and direction changing path 2c or 2d, thus causing the production of relatively large levels of noise and vibration.

SUMMARY OF THE INVENTION

In consideration of the above-mentioned disadvantages of the prior art, the object of the present invention is to provide a rolling guide unit that inhibits the production of noise and vibrations.

The present invention provides a rolling guide unit equipped with a track rail, in which tracks are formed in the lengthwise direction, a slider having a rolling element circulating path containing a load bearing track corresponding to said track, and which is able to move relative to said track rail, and a plurality of rolling elements arranged and contained in said rolling element circulating path that bear the load by circulating while rolling over said track; wherein, at least either said track or rolling element circulating path is additionally provided with an elastic member so as to make contact with said rolling elements.

In addition, the present invention provides a rolling guide unit equipped with a track rail, in which tracks are formed in the lengthwise direction, a slider having a rolling element circulating path containing a load bearing track corresponding to said track, and which is able to move relative to said track rail, a plurality of rolling elements arranged and contained in said rolling element circulating path that bear the load by circulating while rolling over said track, and a retaining member attached to said slider while extending along said load bearing track that prevents said rolling elements from falling out of said load bearing track; wherein, an elastic member is provided on said retaining member so as to make contact with said rolling elements.

In addition, the present invention also provides a rolling guide unit equipped with a track rail, in which tracks are formed in the lengthwise direction, a slider having a rolling element circulating path containing a load bearing track corresponding to said track, and which is able to move relative to said track rail, and a plurality of rollers arranged and contained within said rolling element circulating path that bear the load by circulating while rolling over said track; wherein, a ring-shaped groove is formed in the circumferential direction on the outside of said rollers, and an elastic member is provided in said ring-shaped groove so as to make contact with said track and rolling element circulating path.

DESCRIPTION OF THE PREFERRED EMBODIMENTS

The following provides an explanation of the embodiments of the present invention with reference to the attached drawings.

Figure 1:
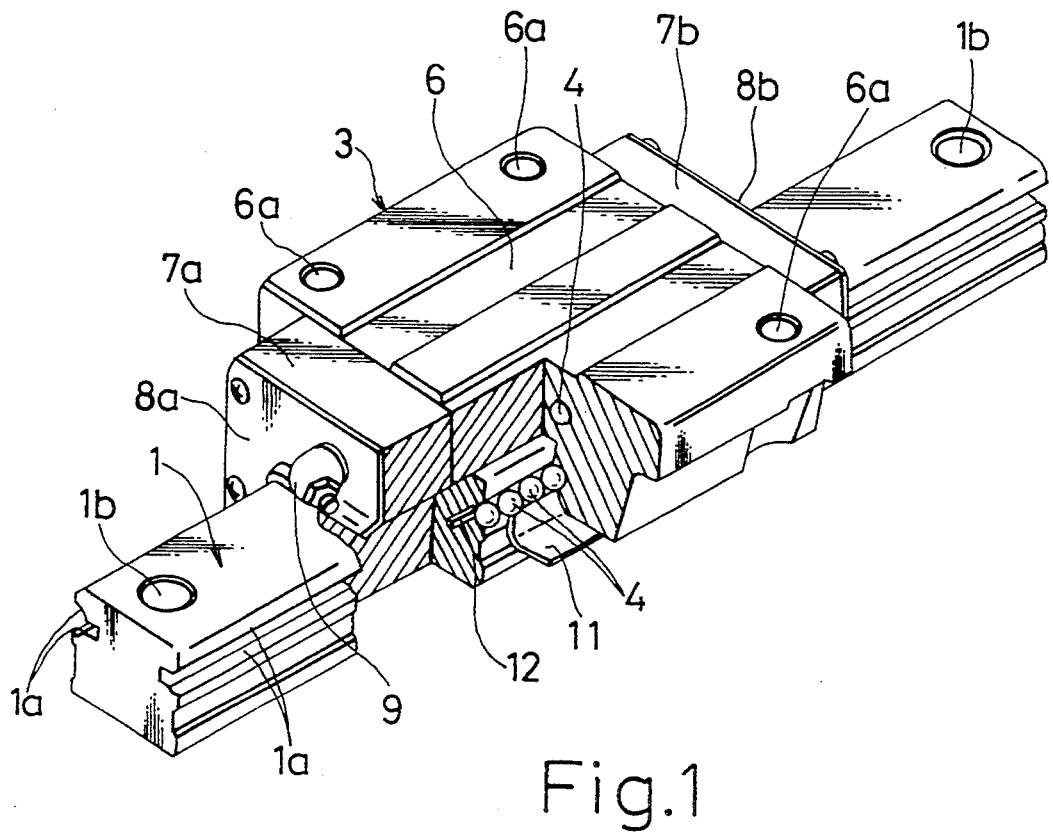
FIG. 1 shows a perspective view, including a partial cross-section, of the essential portion of a rolling guide unit of the prior art.
Figure 2:
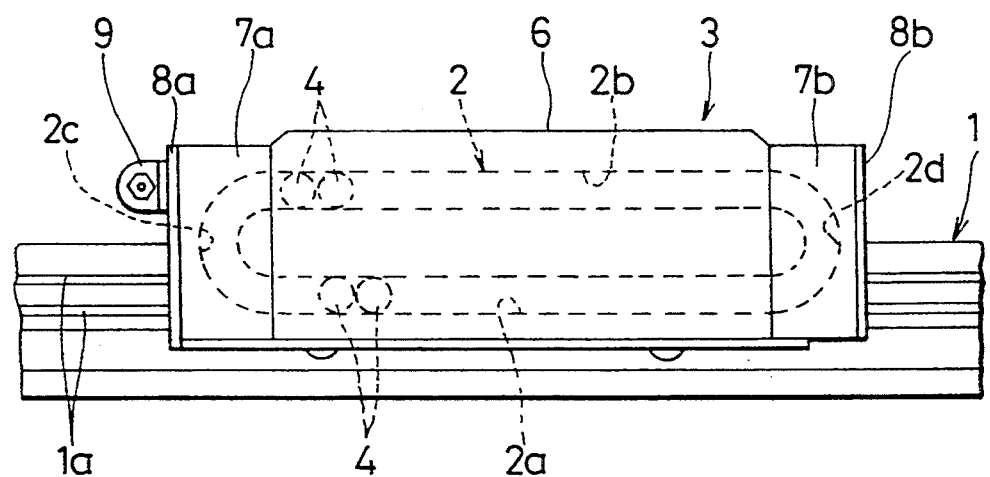
FIG. 2 is a front view of the essential portion of the rolling guide unit shown in FIG. 1.

FIGS. 3 through 7 show a first embodiment of the rolling guide unit of the present invention. Furthermore, since said rolling guide unit is composed similar to the rolling guide unit of the prior art shown in FIGS. 1 and 2 with the exception of those portions explained below, the explanation will only focus on the essential portion with an overall explanation of the unit omitted. In addition, in the following explanation, the same reference numerals will be used for those constituent members which are identical to the constituent members of said rolling guide unit of the prior art.

Figure 3:
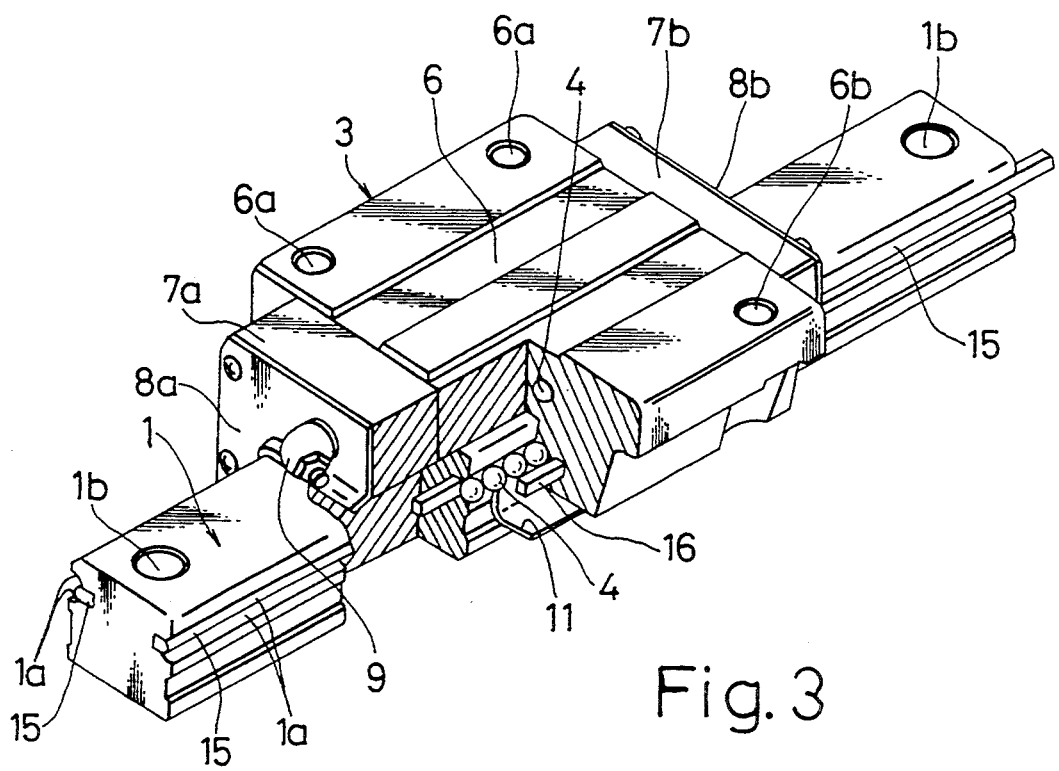
FIG. 3 is a perspective view, including a partial cross-section, of the essential portion of a first embodiment of the rolling guide unit of the present invention.
Figure 4:
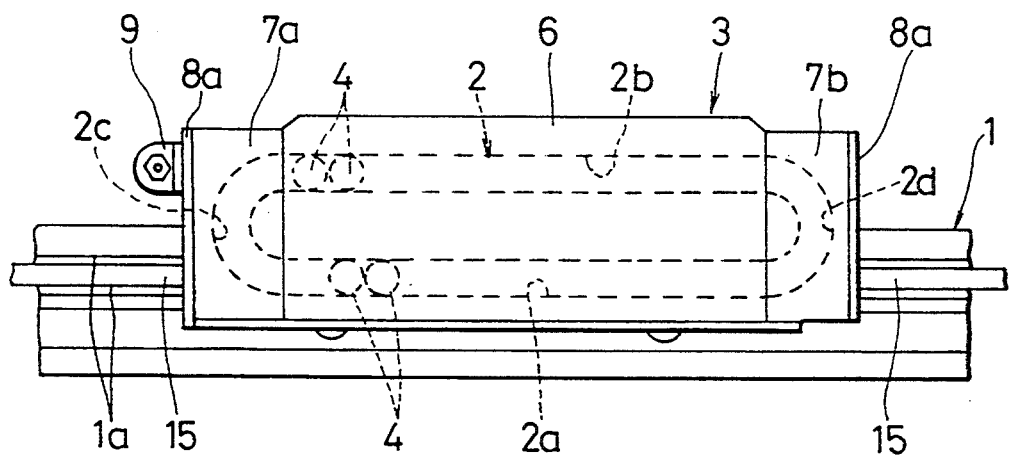
FIG. 4 is a front view of the essential portion of the rolling guide unit shown in FIG. 3.

As shown in FIGS. 3 through 7, in this first embodiment of the rolling guide unit, elastic member 15, made of rubber or plastic and so on, is provided along track groove 1a formed in track rail 1 over which balls 4 are to roll. In addition, as shown in FIG. 3 as well as FIGS. 5 through 7, a similar elastic member 16 is provided along loading bearing track groove 2a provided in sliding unit 3 corresponding to said track groove 1a. Balls 4 then move along said track groove 1a and load bearing track groove 2a while making contact with these elastic members 15 and 16.

Figure 6:
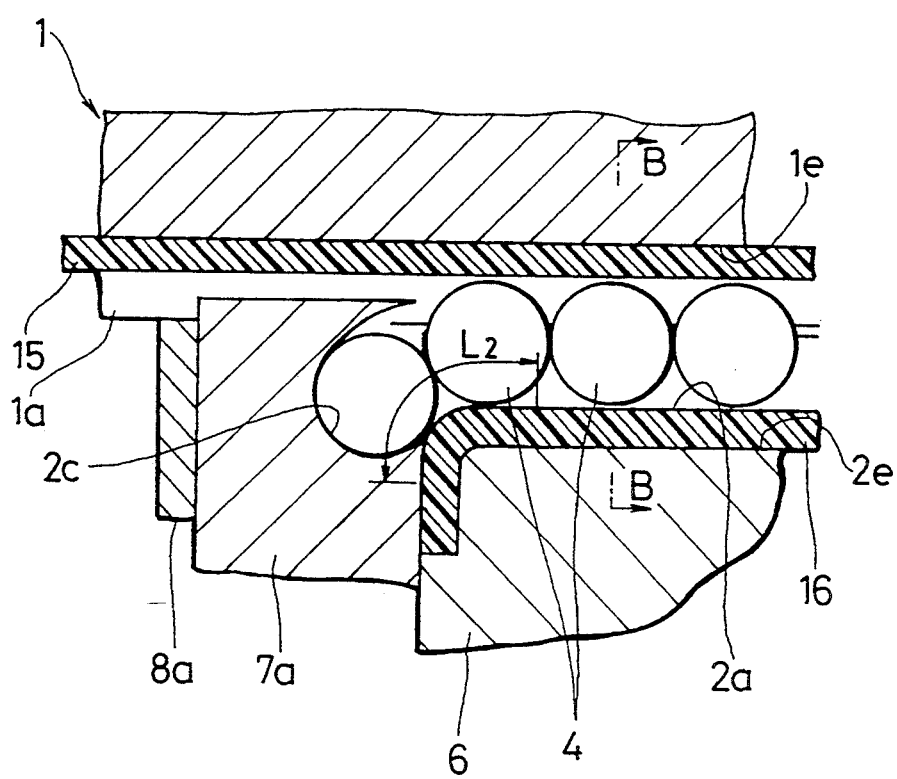
FIG. 6 is an enlarged view of portion A in FIG. 5.
Figure 7:
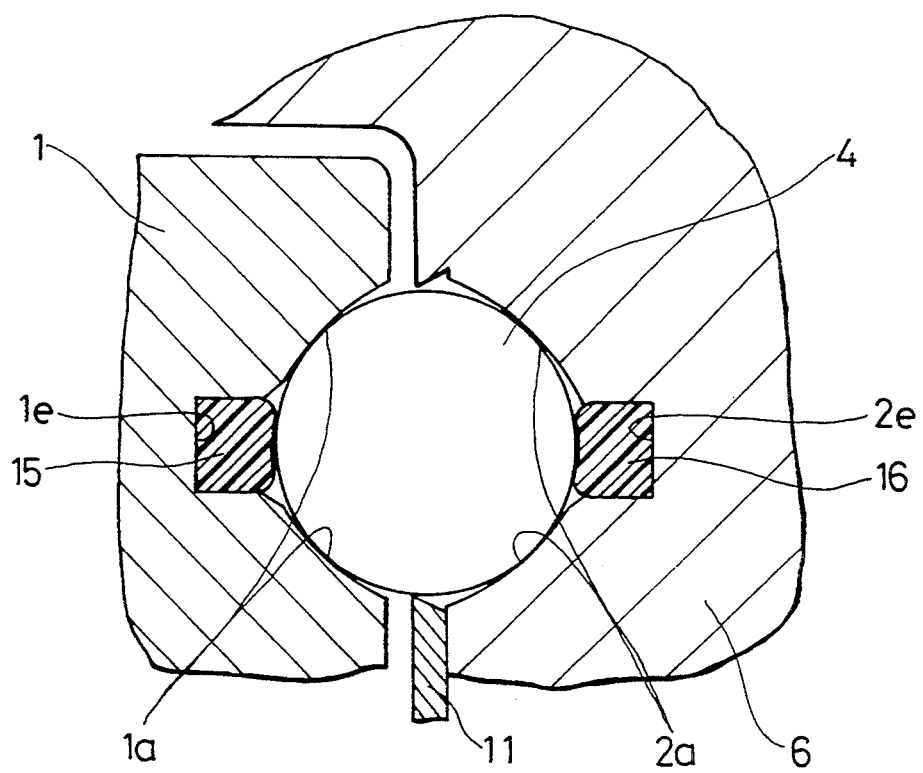
FIG. 7 is a cross-sectional view taken along line B—B with respect to FIG. 6.

More specifically, as shown in FIGS. 6 and 7, grooves 1e and 2e, having roughly rectangular-shaped cross-sections, are formed along the bottom portions of track groove 1a and load bearing track groove 2a. Both elastic members 15 and 16 fit into these grooves 1e and 2e and are secured with adhesive and so on. In addition, as is clear from FIG. 7, both elastic members 15 and 16 are formed so as to slightly protrude from these grooves 1e and 2e, and balls 4 roll while elastically deforming this protruding portion.

Figure 8:
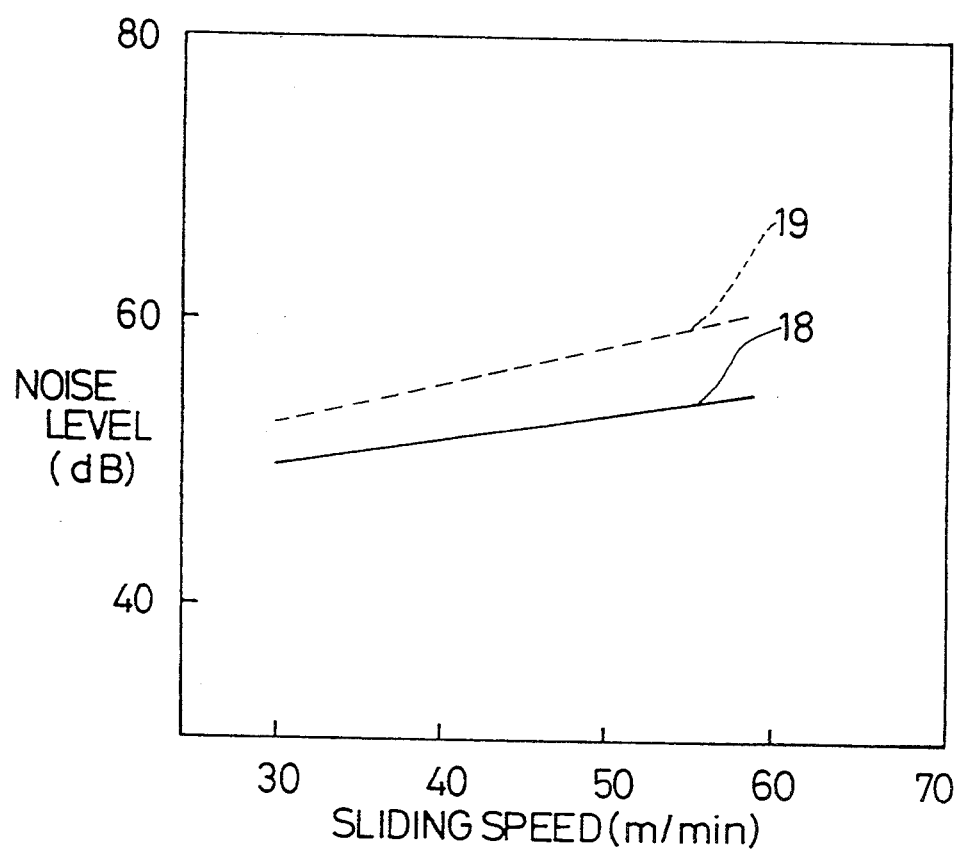
FIG. 8 is a graph of sliding speed versus noise level with respect to the linear motion rolling guide unit shown in FIGS. 3 through 7 and a linear motion rolling guide unit of the prior art.

FIG. 8 shows the relationship between the sliding speed of the sliding unit of a linear motion rolling guide unit and the noise level that is produced by the rolling of balls corresponding to said speed. The characteristics of the linear motion rolling guide unit as claimed in the present invention described above are shown with solid line 18. The characteristics indicated with broken line 19 in this drawing are those relating to a linear motion rolling guide unit of the prior art shown in FIGS. 1 and 2. In contrast to these characteristics, the level of noise produced by the linear motion rolling guide unit as claimed in the present invention is relatively lower in comparison to that of the prior art. In addition, the level of vibrations produced is also inhibited in a similar manner.

Furthermore, although elastic members 15 and 16 are provided in both track groove 1a of track rail 1 and load bearing track groove 2a of sliding unit 3 corresponding to said track rail 1a, a constitution may also be employed in which only one such elastic member is provided in either.

Figure 5:
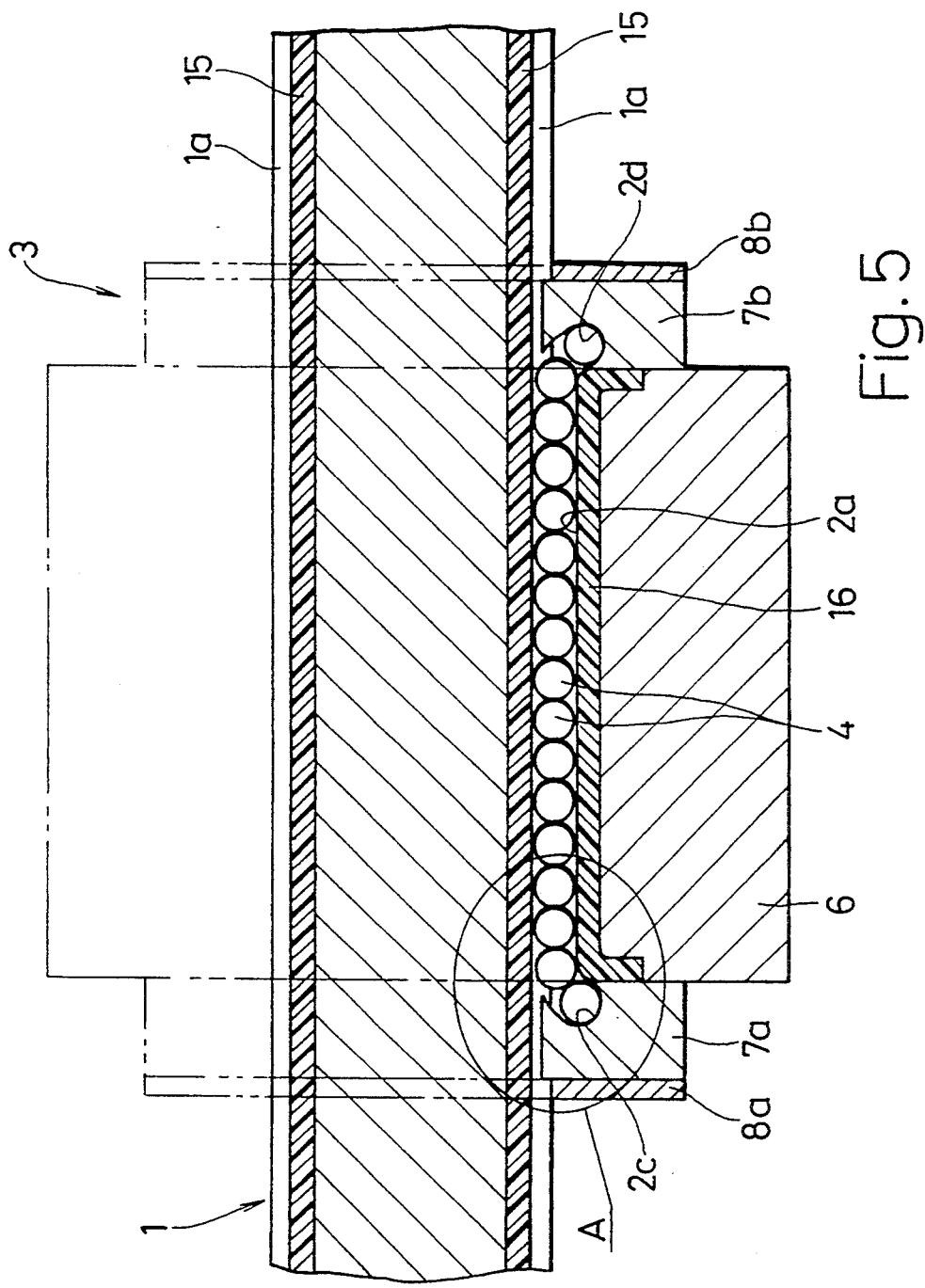
FIG. 5 is a top view, including a cross-section, of the essential portion of the rolling guide unit shown in FIGS. 3 and 4.

In addition, although elastic member 16 is provided along the entire length of load bearing track groove 2a in the above-mentioned embodiment as is clear from FIG. 5, said elastic member 16 may also be provided over the range indicated by $L_2$ in FIG. 6, namely so as to correspond to only the connecting portion of load bearing track groove 2a and direction changing path 2c (2d) and its vicinity. Namely, at this portion, balls 4 collide with the track surface of track groove 1a when moving from direction changing path 2c (2d) between track groove 1a and load bearing track groove 2a, and conversely, collide with the inner wall surface of the connecting portion of said load bearing track groove 2a and direction changing path 2c (2d) when moving from between said track groove 1a and load bearing track groove 2a to direction changing path 2c (2d), thus resulting in the production of relatively large noise. Accordingly, by arranging elastic member 16 only at this portion, the production of noise can be effectively inhibited.

The following provides an explanation of a second embodiment of the rolling guide unit of the present invention based on FIGS. 9 through 13. Furthermore, since said second embodiment of the rolling guide unit is composed similar to the first embodiment of the rolling guide unit shown in FIGS. 3 through 7 with the exception of those portions explained below, the explanation will only focus on the essential portion with an overall explanation of the unit omitted. In addition, in the following explanation, the same reference numerals will be used for those constituent members which are identical to the constituent members of said first embodiment of the rolling guide unit of the present invention.

Figure 9:
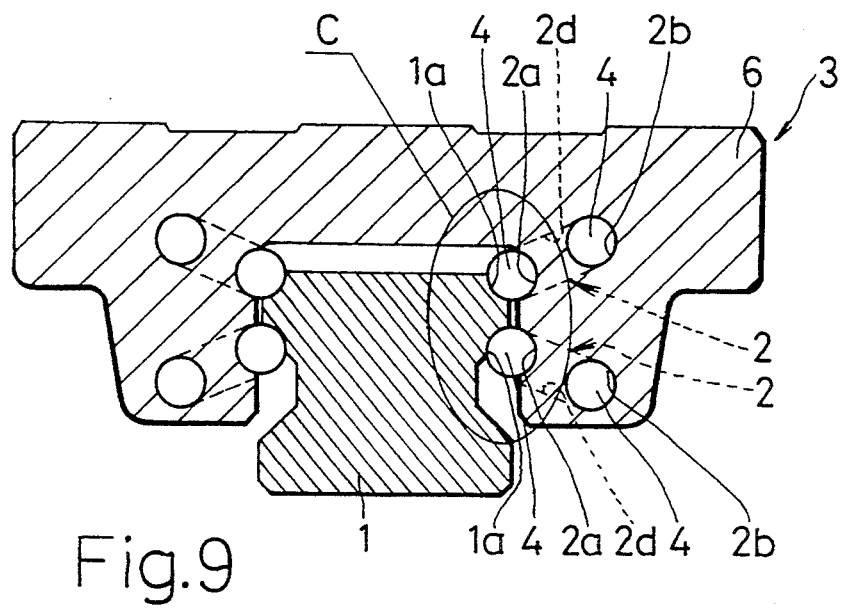
FIG. 9 is a vertical cross-sectional view of a second embodiment of the rolling guide unit of the present invention.

As shown in FIG. 9, in this second embodiment of the rolling guide unit of the present invention, a total of four track grooves 1a, consisting of two on both the left and right shoulders of track rail 1, are formed on said track rail 1. Four rolling element circulating paths 2 are formed corresponding to each of said track rails 1a in sliding unit 3. Balls 4 are arranged and contained within each said rolling element circulating path 2 which circulate while rolling over said track groove 1a accompanying movement of sliding unit 3. Furthermore, since said rolling guide unit is formed laterally symmetrically, reference numerals are only indicated for one side of said rolling guide unit to avoid complicating the drawing.

Figure 10:
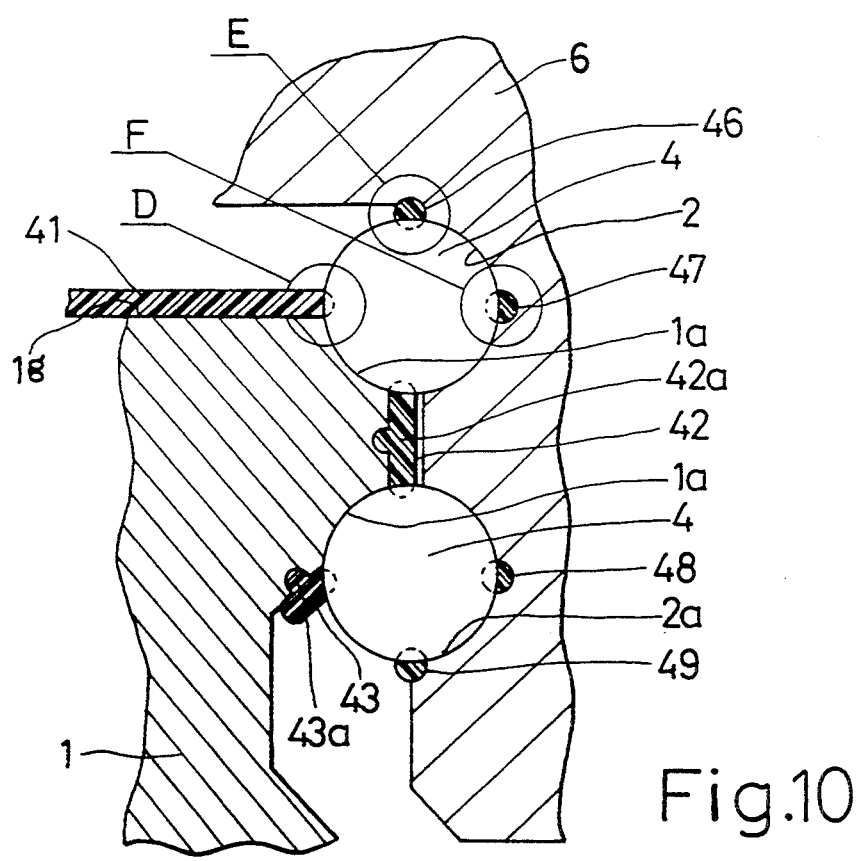
FIG. 10 is an enlarged view of portion C in FIG. 9.

FIG. 10 is an enlarged view of portion C in FIG. 9. As is clear from said drawing, three types of elastic members 41, 42 and 43, made or rubber, plastic and so forth, are formed on each side of track rail 1. However, elastic member 41 is used by both sides of track rail 1, extending over both the right and left sides of said track rail 1.

Figure 11:
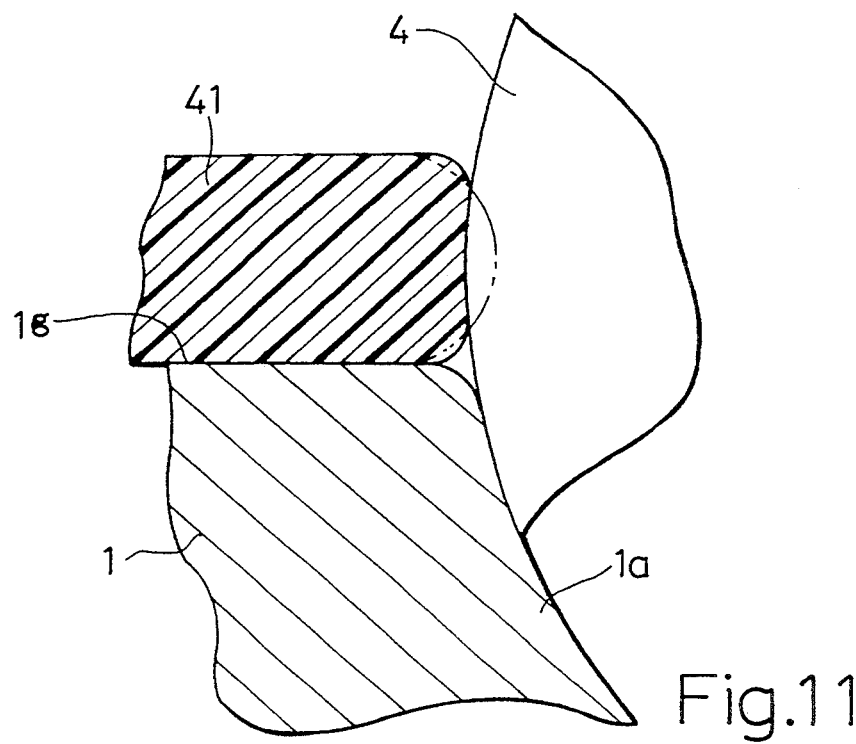
FIG. 11 is an enlarged view of portion D in FIG. 10.

As shown in FIG. 10, elastic member 41 is formed into the shape of a flat plate. Said elastic member 41 is provided near track groove 1a on the upper side of track rail 1, in this case on upper surface 1g of said track rail 1, and extends over roughly the entire length of said track rail 1. It is adhered to track rail 1 by adhesive and so forth. Furthermore, other elastic members 42 and 43 are of the same length as this elastic member 41, provided over nearly the entire length of said track rail 1. FIG. 11 is an enlarged view of portion D in FIG. 10. As is clear from said drawing, the end of elastic member 41 faces track groove 1a of track rail 1 as indicated with the double dot broken line. Namely, balls 4 make contact with the protruding portion of elastic member 41 and roll in the state in which said elastic member 41 is elastically deformed as indicated with the solid line in the drawing.

In addition, elastic member 42 is formed into the shape of a narrow band as shown in FIG. 10. Said elastic member 42 is arranged near upper and lower track grooves 1a, in this case so as to be juxtapositioned between each of said track grooves 1a. Said elastic member 42 is also adhered to track rail 1 with adhesive and so forth. Both ends of said elastic member 42 are facing upper and lower track grooves 1a as shown with the double dot broken line in said drawing. Thus, balls 4 roll while elastically deforming these protruding portions.

In addition, the remaining elastic member 43 is also formed into the shape of a narrow band in the same manner as the above-mentioned elastic member 42. It is arranged towards the bottom of lower track groove 1a, and is adhered to track rail 1 with adhesive and so forth. Furthermore, since the surface areas of said elastic member 43 and the above-mentioned elastic member 42 are small, projections 43a and 42a are formed in their back sides as shown in FIG. 10. These projections 43a and 42a engage with grooves (reference numerals not shown) formed in track rail 1 to increase adhesive strength.

As shown in FIG. 10, one end of the above-mentioned elastic member 43 is positioned so as to face lower track groove 1a. Thus, balls 4 roll while elastically deforming the protruding portion of said elastic member 43.

On the other hand, as shown in FIG. 10, four types of elastic members 46–49, made of the same material as each of the above-mentioned elastic members 41–43, are provided on each side of casing 6 of sliding unit 3. As is clear from said drawing, the cross-sections of these elastic members 46–49 are, for example, roughly circular. Said elastic members 46–49 are mutually of the same length, are provided over roughly the entire length of casing 6, and are adhered to said casing 6 with adhesive and so forth. Furthermore, elastic member 46 is arranged near the upper end of upper load bearing track groove 2a, while elastic member 49 is arranged near the bottom end of lower load bearing track groove 2a. In addition, other elastic members 47 and 48 are arranged at the centers of these load bearing track grooves 2a.

Figure 12:
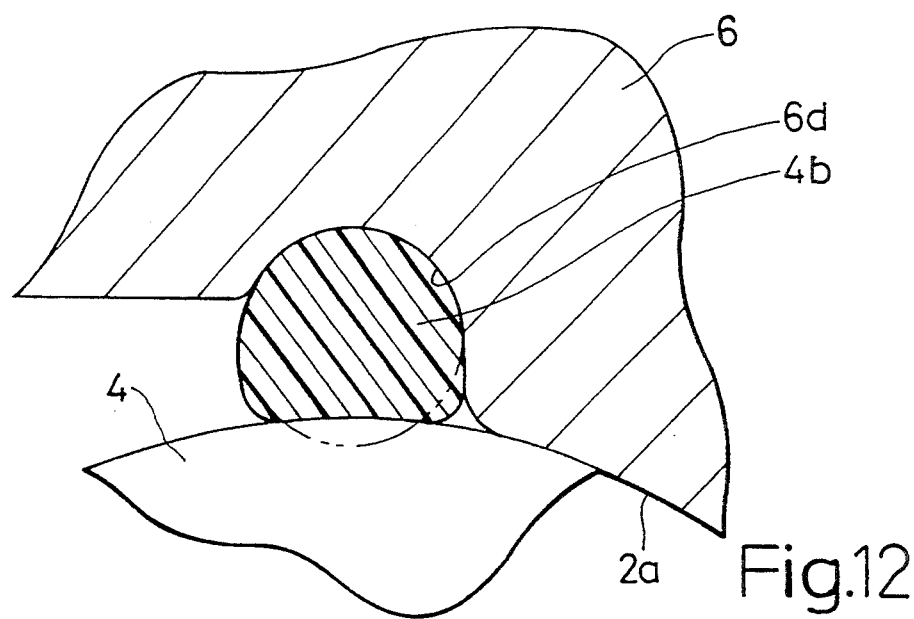
FIG. 12 is an enlarged view of portion E in FIG. 10.

FIG. 12 is an enlarged view of portion E in FIG. 10. As is clear from said drawing, roughly the upper half of elastic member 46 engages with groove 6d formed in casing 6, while a portion of the lower half faces upper load bearing track groove 2a as indicated with the double dot broken line. Namely, balls 4 make contact with this protruding portion, and roll while elastically deforming said protruding portion as indicated with the solid line in said drawing.

Figure 13:
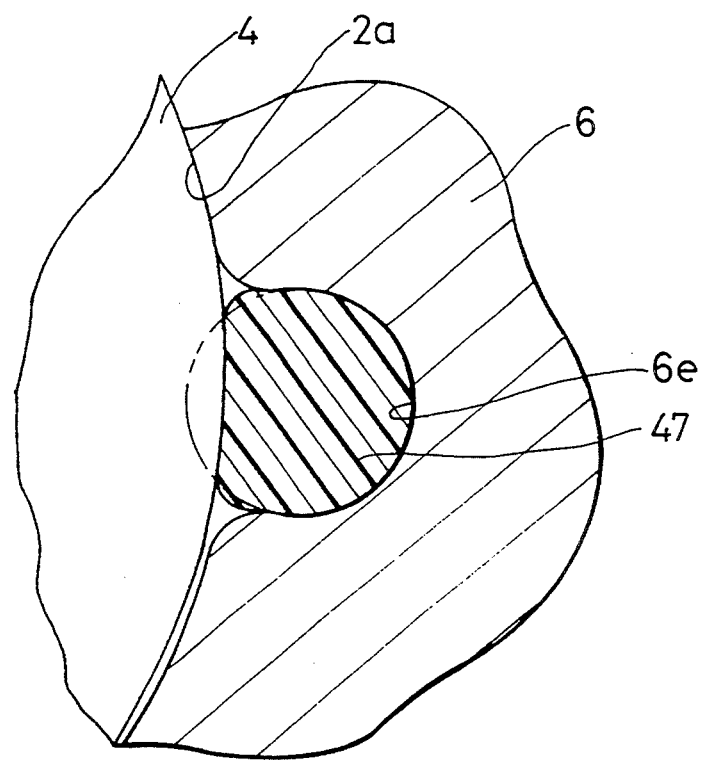
FIG. 13 is an enlarged view of portion F in FIG. 10.

FIG. 13 is an enlarged view of portion F in FIG. 10. As is clear from said drawing, roughly the majority of the second elastic member 47 provided below the above-mentioned elastic member 46 engages with groove 6e formed along the bottom of load bearing track groove 2a of casing 6, and one portion faces the upper load bearing track groove as shown with the double dot broken line. Thus, balls 4 roll while elastically deforming that protruding portion.

Furthermore, the manner of attachment to casing 6 as well as the manner of contact with balls 4 of the remaining two elastic members 48 and 49 are the same as elastic members 46 and 47 described above.

In the above-mentioned constitution, since balls 4 roll while making contact with elastic members 41–43 as well as elastic members 46–49, this constitution offers the advantage of inhibiting the production of noise and vibrations in the same manner as the first embodiment of the rolling guide unit previously described. Furthermore, although elastic members are providing for cushioning in both track rail 1 and sliding unit 3 in the present embodiment, a constitution may also be employed in which such elastic members are only provided in either.

Figure 14:
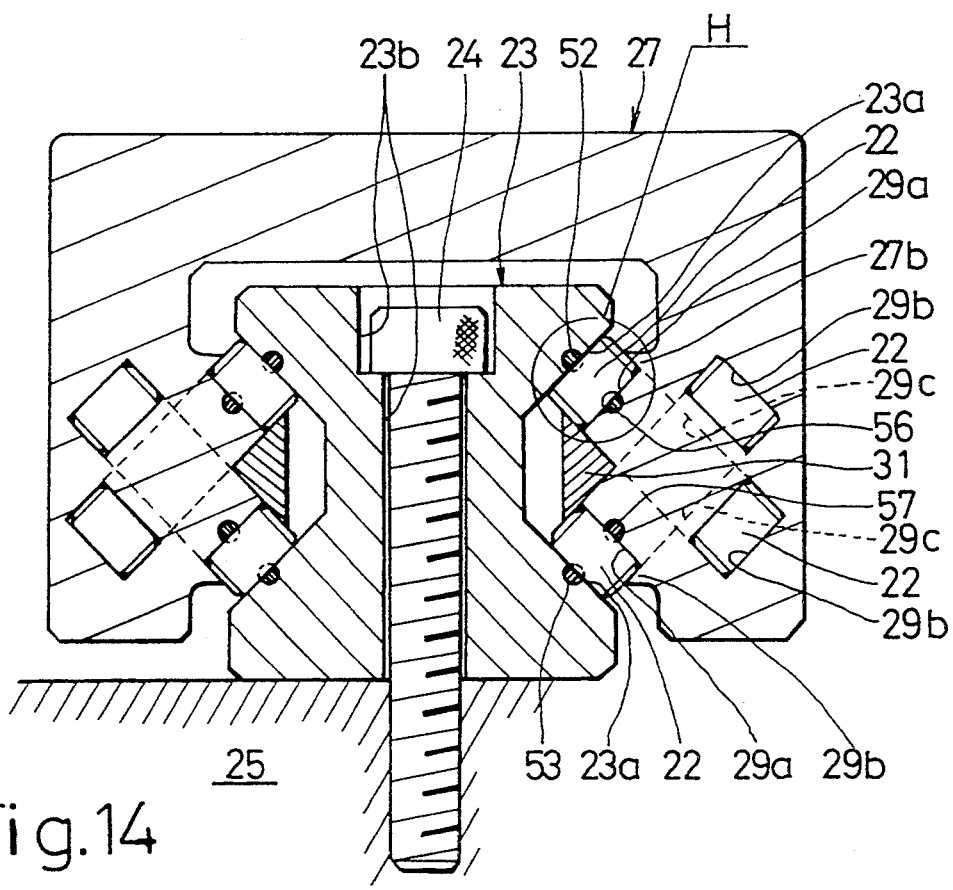
FIG. 14 is a vertical cross-sectional view of a third embodiment of the rolling guide unit of the present invention.
Figure 15:
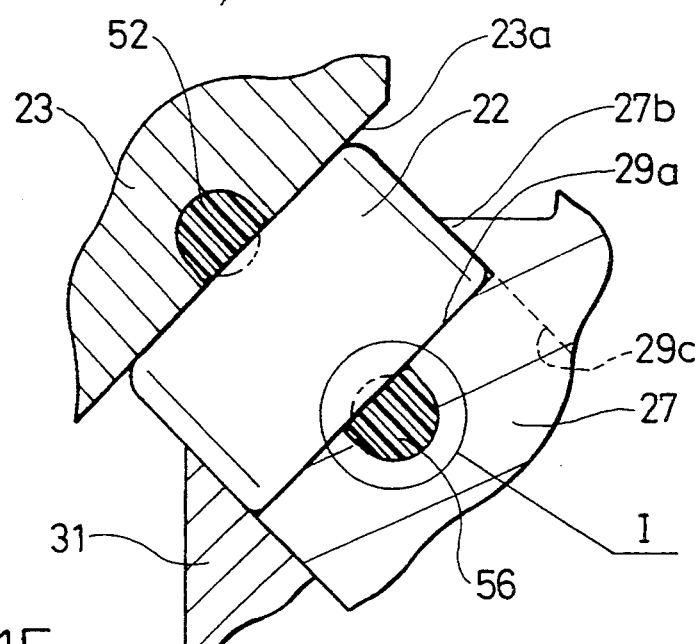
FIG. 15 is an enlarged view of portion H in FIG. 14.
Figure 16:
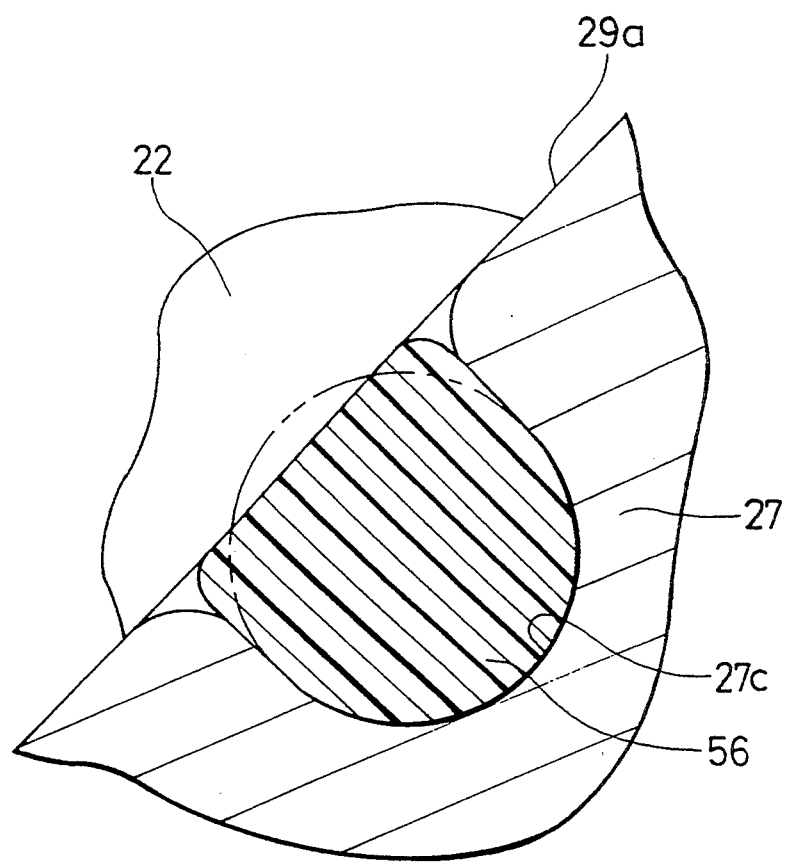
FIG. 16 is an enlarged view of portion I in FIG. 15.

FIGS. 14 through 16 show a third embodiment of the rolling guide unit of the present invention. Furthermore, since said rolling guide unit is formed laterally symmetrically, reference numerals are only indicated for one side of said rolling guide unit to avoid complicating the drawing.

As shown in FIG. 14, said rolling guide unit is equipped with rolling elements in the form of rollers 22 that roll while bearing the load. Thus, track rails formed in the lengthwise direction in track rail 23 for rolling of these rollers 22 are in the form of flat track surfaces 23a. A total of 4 of said track surfaces 23a, consisting of two surfaces each on the right and left sides, are formed on said track rail 23. Furthermore, as shown in FIG. 14, bolt insertion hole 23b is formed in track rail 23, and track rail 23 is fastened to bed 25 of a machine tool and so forth by bolt 24 inserted into said bolt insertion hole 23b.

On the other hand, rolling element circulating paths corresponding to each of the above-mentioned track surfaces 23a are formed in a slider in the form of sliding unit 27 that moves along the above-mentioned track rail 23. The above-mentioned rollers 22 are arranged and contained to circulate freely within each of said rolling element circulating paths. As shown in the drawing, each of said rolling element circulating paths is composed of a load bearing track in the form of load bearing track surface 29a that corresponds to track surface 23a of track rail 23, return path 29b parallel to said load bearing track surface 29a and direction changing path 29c that connects said load bearing track surface 29a and return path 29c.

Furthermore, FIG. 15 is an enlarged view of portion H in FIG. 14. As shown in said drawing, guiding portion 27b for guiding the above-mentioned rollers 22 is formed in sliding unit 27, and guiding member 31 is attached to said sliding member 27.

As shown in FIGS. 14 and 15, two types of elastic members 52 and 53, made of rubber or plastic, are provided on each side of track rail 23. In addition, two types of elastic members 56 and 57, made of the same material as said elastic members 52 and 53, are provided on each side of sliding unit 27 as well. These elastic members 56 and 57 are arranged in the centers of track surfaces 23a of track rail 23 and the centers of load bearing track surfaces 29a of sliding unit 27 in order to correspond to the central position in the axial direction of rolling rollers 22 together with the above-mentioned elastic members 52 and 53. The cross-sections of these elastic members 52, 53, 56 and 57 are, for example, roughly circular, and each are adhered with adhesive and so forth to track rail 23 and sliding unit 27, respectively. Elastic members 52 and 53 are provided roughly over the entire length of track rail 23, while elastic members 56 and 57 are provided, for example, roughly over the entire lengths of load bearing track surfaces 29a.

FIG. 16 is an enlarged view of portion I in FIG. 15. As is clear from said drawing, roughly the majority of the above-mentioned elastic member 56 is engaged with groove 27c formed along the central portion of load bearing track surface 29a of sliding unit 27, and a portion of said elastic member 56 protrudes beyond load bearing track surface 29a as shown with the double dot broken line. Namely, rollers 22 make contact with this protruding portion and roll while elastically deforming said protruding portion as indicated with the solid line in said drawing.

Furthermore, the manner of attachment to track rail 23 and sliding unit 27, respectively, as well as the manner of contact with rollers 22 of the remaining three elastic members 52, 53 and 57 are the same as elastic member 56 described above.

Since rollers 22 roll while making contact with each elastic member 52, 53, 56 and 57 in the present constitution, the production of noise and vibrations is inhibited in the same manner as the first and second embodiments of the rolling guide unit previously described. Furthermore, although elastic members for cushioning are provided on both track rail 23 and sliding unit 27 in the present embodiment, a constitution may also be employed in which said elastic members are provided only on either.

Figure 17:
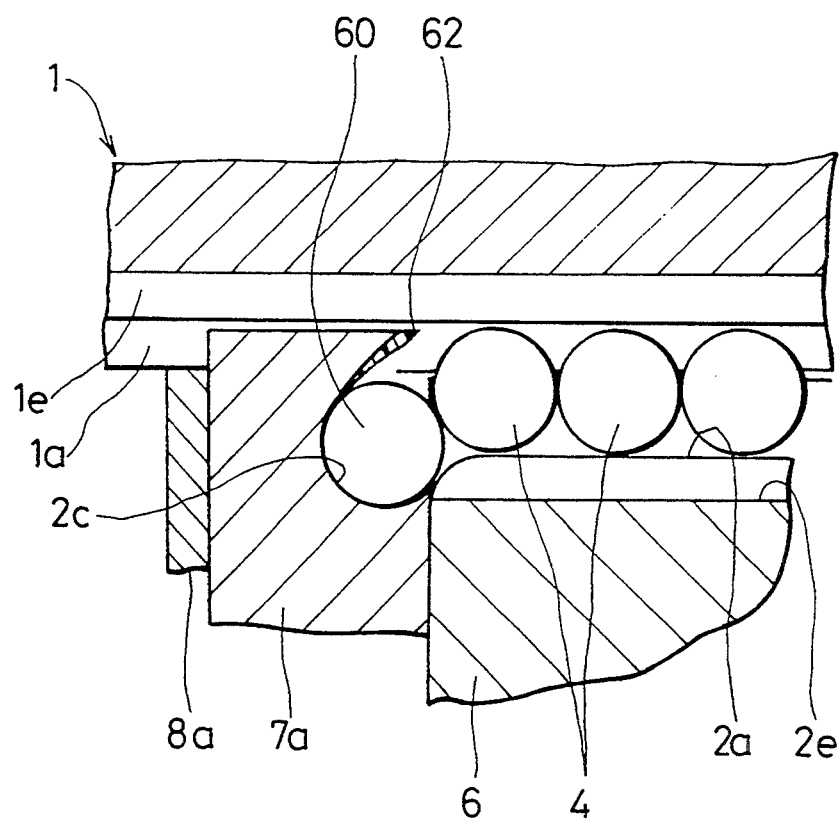
FIG. 17 is a top view, including a cross-section, of the essential portion of a fourth embodiment of the rolling guide unit of the present invention.

Next, an explanation of a fourth embodiment of the rolling guide unit of the present invention is given based on FIG. 17. Furthermore, since said rolling guide unit is composed similar to the first embodiment of the rolling guide unit shown in FIGS. 3 through 7 with the exception of those portions explained below, the explanation will only focus on the essential portion with an overall explanation of the unit omitted. In addition, in the following explanation, the same reference numerals will be used for those constituent members which are identical or correspond to the constituent members of said first embodiment of the rolling guide unit.

In FIG. 17, rake 60 is formed in end cap 7a, a constituent member of the sliding unit, which rakes balls 4 rolling between track groove 1a of track rail 1 and load bearing track groove 2a of casing 6 and feeds said balls 4 into direction changing path 2c. Elastic member 62 is adhered to said rake 60 with adhesive and so forth so as to make contact with balls 4. This elastic member 62 is also made of rubber or plastic. According to said constitution, cushioning results together with preventing balls 4 from directly colliding with rake 60. In addition, since balls 4 also do not collide with track groove 1a of track rail 1 when moving from directing changing path 2c to load bearing track groove 2a, production of noise and vibrations is inhibited.

Figure 18:
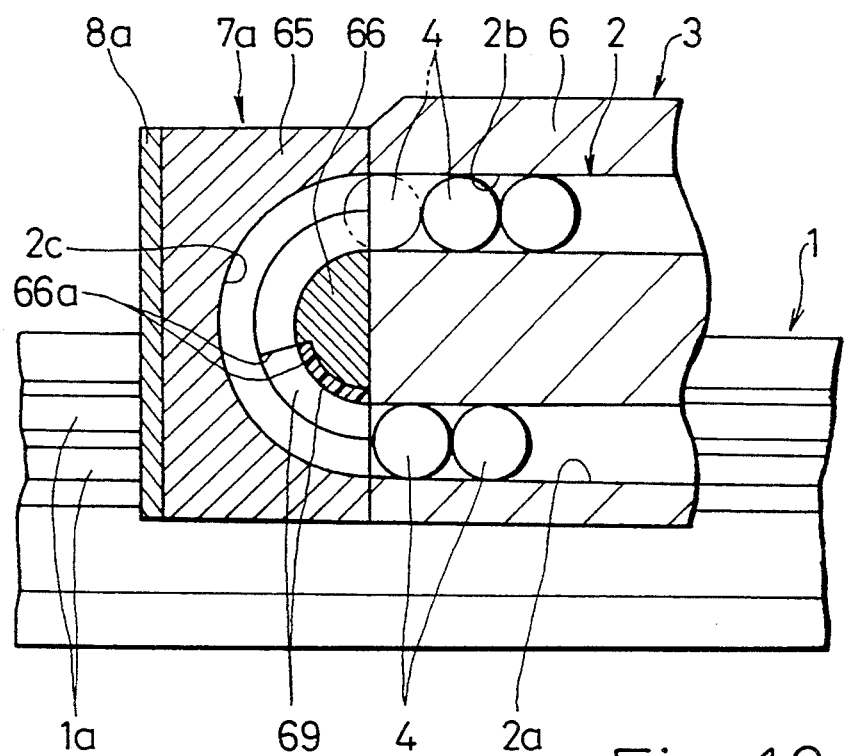
FIG. 18 is a front view, including a cross-section, of the essential portion of a fifth embodiment of the rolling guide unit of the present invention.
Figure 19:
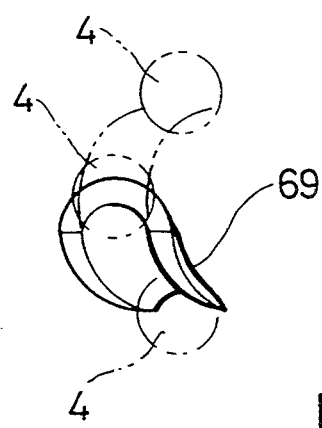
FIG. 19 is a perspective view indicating the elastic member and balls contained in the constitution shown in FIG. 18.

Next, an explanation of a fifth embodiment of the rolling guide unit of the present invention is given based on FIGS. 18 and 19. Furthermore, since said rolling guide unit is composed similar to the first embodiment of the rolling guide unit shown in FIGS. 3 through 7 with the exception of those portions explained below, the explanation will only focus on the essential portion with an overall explanation of the unit omitted. In addition, in the following explanation, the same reference numerals will be used for those constituent members which are identical or correspond to the constituent members of said first embodiment of the rolling guide unit.

In FIG. 18, end cap 7a, which composes casing 6 and sliding unit 3, is composed of body 65, in which the outside half of direction changing path 2c is formed, and spacer 66, in which the inside half of said direction changing path 2c is formed. Elastic member 69, made of rubber, plastic and so forth, is provided on said spacer 66. More specifically, said elastic member 69 is formed, in this case for example, into the shape of a saddle which fits into concave portion 66a formed in the inner surface of spacer 66. The inner surface of said elastic member 69 thus forms a portion of the above-mentioned direction changing path 2c.

In the constitution described above, balls 4 make contact with elastic member 69 when they enter direction changing path 2c, thus inhibiting the production of noise and vibrations.

Figure 20:
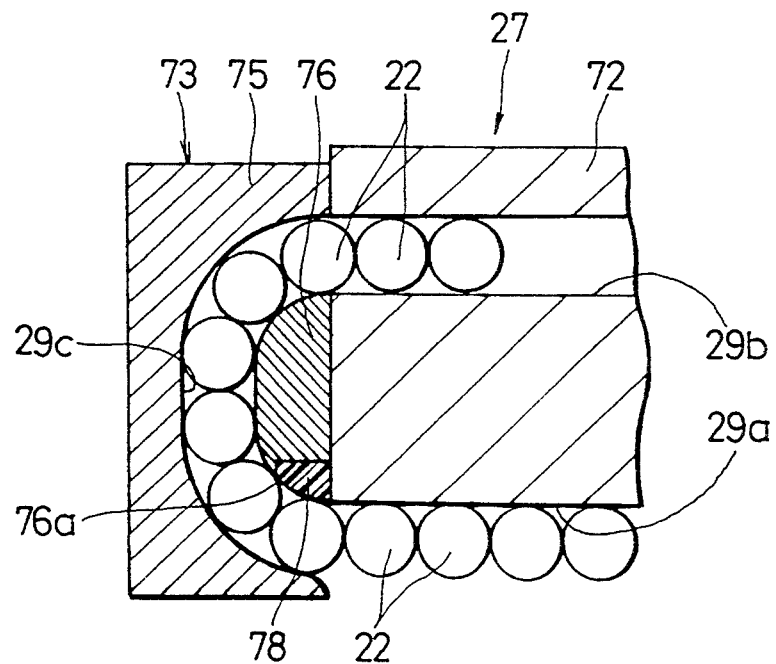
FIG. 20 is a top view, including a cross-section, of the essential portion of a sixth embodiment of the rolling guide unit of the present invention.
Figure 21:
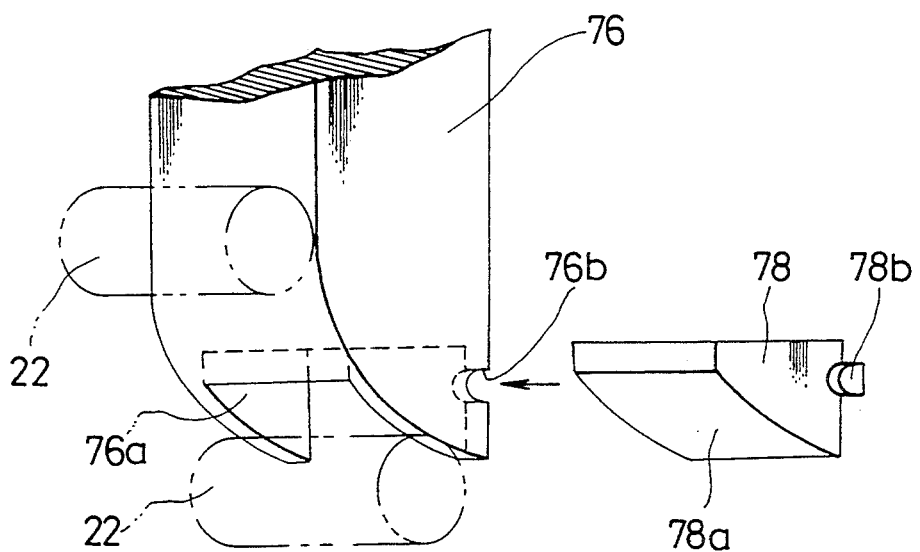
FIG. 21 is a perspective view indicating the elastic member, spacer and rollers contained in the constitution shown in FIG. 20.

FIGS. 20 and 21 show a sixth embodiment of the rolling guide unit of the present invention. Furthermore, since said rolling guide unit is composed similar to the third embodiment of the rolling guide unit shown in FIGS. 14 through 16 with the exception of those portions explained below, the explanation will only focus on the essential portion with an overall explanation of the unit omitted. In addition, in the following explanation, the same reference numerals will be used for those constituent members which are identical or correspond to the constituent members of said third embodiment of the rolling guide unit.

As shown in FIG. 20, in said rolling guide unit, end cap 73, which along with casing 72 composes sliding unit 27, is composed of body 75, in which the outside half of direction changing path 29c is formed, and spacer 76, in which the inside half of said direction changing path 29c is formed. Elastic member 78, made of rubber, plastic and so forth, is provided on said spacer 76. More specifically, concave portion 76a is formed in spacer 76 at the portion where rollers 22 enter direction changing path 29c from load bearing track surface 29a (see FIG. 20). Elastic member 78 fits into this concave portion 76a so that curved surface 78a formed in said elastic member 78 forms a portion of the above-mentioned direction changing path 29c. Furthermore, as shown in FIG. 21, projection 78b is formed on the end of elastic member 78. Said elastic member 78 is positioned by this projection 78b fitting into notch 76b formed in spacer 76.

In said constitution, the production of noise and vibrations is inhibited due to rollers 22 rolling while elastically deforming elastic member 78 after making contact with said elastic member 78 when said rollers 22 enter direction changing path 29c from load bearing track surface 29a.

Figure 22:
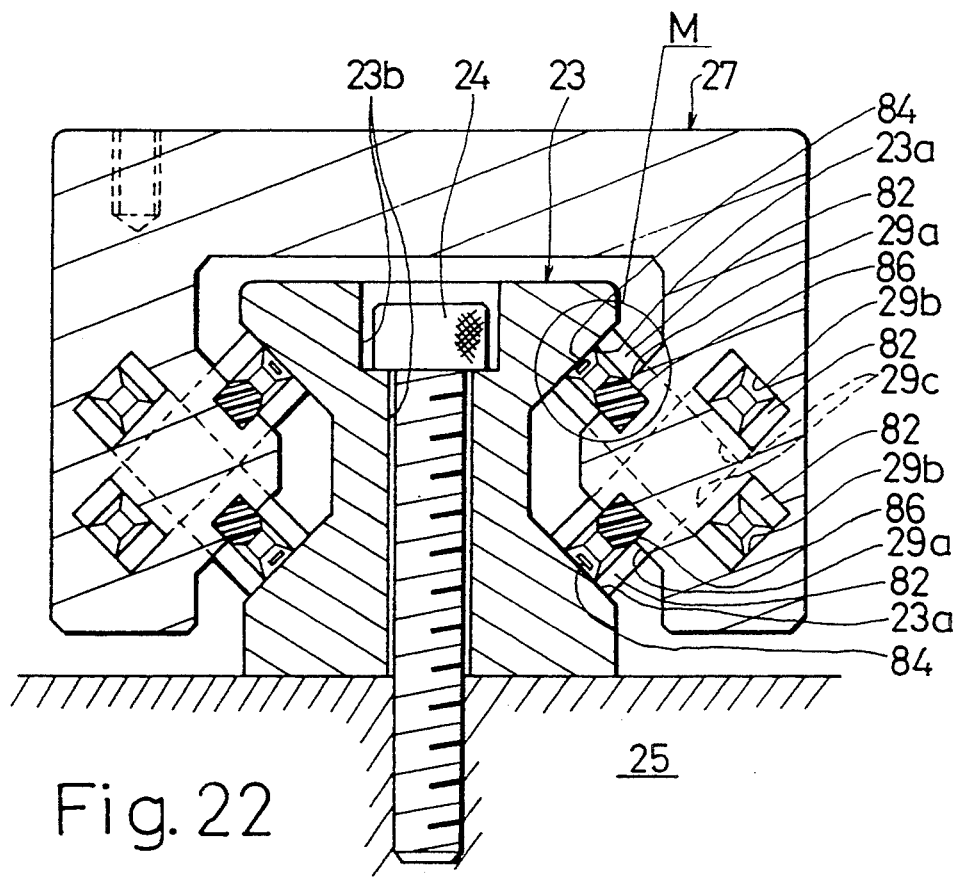
FIG. 22 is a vertical cross-sectional view of a seventh embodiment of the rolling guide unit of the present invention.
Figure 23:
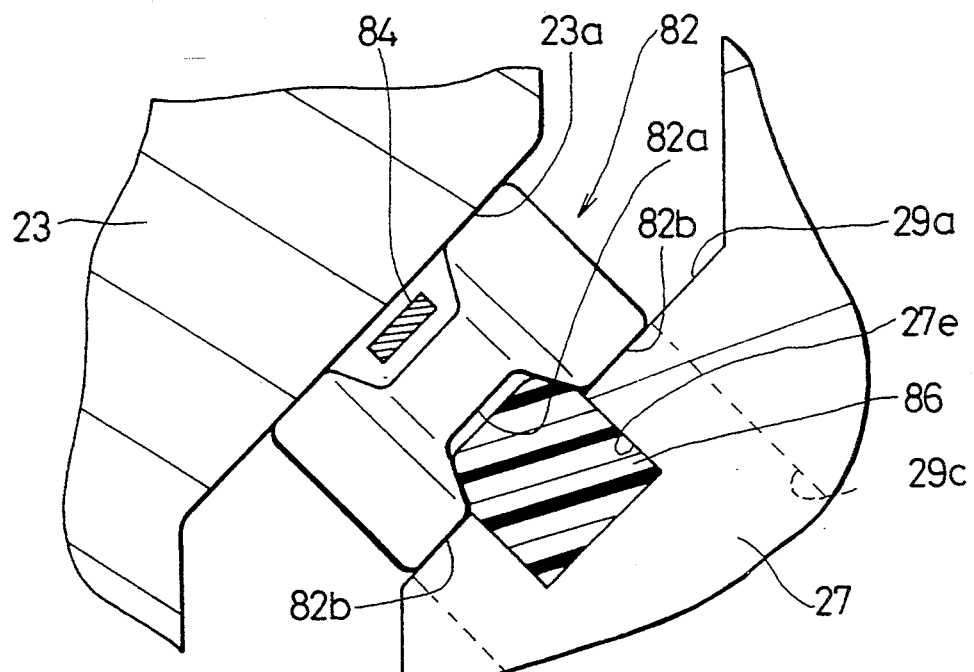
FIG. 23 is an enlarged view of portion M in FIG. 22.

FIGS. 22 and 23 show a seventh embodiment of the rolling guide unit of the present invention. Furthermore, since said rolling guide unit is composed similar to the third embodiment of the rolling guide unit shown in FIGS. 14 through 16 with the exception of those portions explained below, the explanation will only focus on the essential portion with an overall explanation of the unit omitted. In addition, in the following explanation, the same reference numerals will be used for those constituent members which are identical or correspond to the constituent members of said third embodiment of the rolling guide unit. In addition, since said rolling guide unit is formed laterally symmetrically, reference numerals are only indicated for one side of said rolling guide unit to avoid complicating the drawing.

As shown in the drawings, in said rolling guide unit, the rolling elements are in the form of dumbbell-shaped rollers in which ring-shaped grooves 82a (see FIG. 23) are formed in the circumferential direction in the outside.

Furthermore, as shown in FIGS. 22 and 23, retaining member 84 is provided on sliding unit 27 to hold the above-mentioned rollers 82 and prevent them from falling out of load bearing track surface 29a. Retaining member 84 is formed into the shape of a long narrow band made of, for example, spring steel and so forth. It is arranged so as to extend along load bearing track surface 29a and be suspended in ring-shaped grooves 82a of rollers 82 while being attached to sliding unit 27 at both ends.

As is particularly clear from FIG. 23, groove 27e, having a roughly rectangular-shaped cross-section, is formed along load bearing track surface 29a in sliding unit 27. Elastic member 86, made or rubber, plastic and so forth, fits into this groove 27e. The apex of said elastic member 86 protrudes from groove 27e so that this protruding portion makes contact with roller 82 by fitting into ring-shaped groove 82a of said roller 82.

The rolling guide unit having the above-mentioned constitution also offers the advantage of preventing noise and vibrations in the same manner as the third embodiment of the rolling guide unit described above as a result of the damping action of elastic member 86. However, in the present embodiment, since rollers 82 have a dumbbell-shape, and rolling surfaces 82b on both ends make direct contact with track surface 23a of track rail 23 and load bearing track surface 29a of sliding unit 27, a sufficiently large load bearing capacity can be secured.

Figure 24:
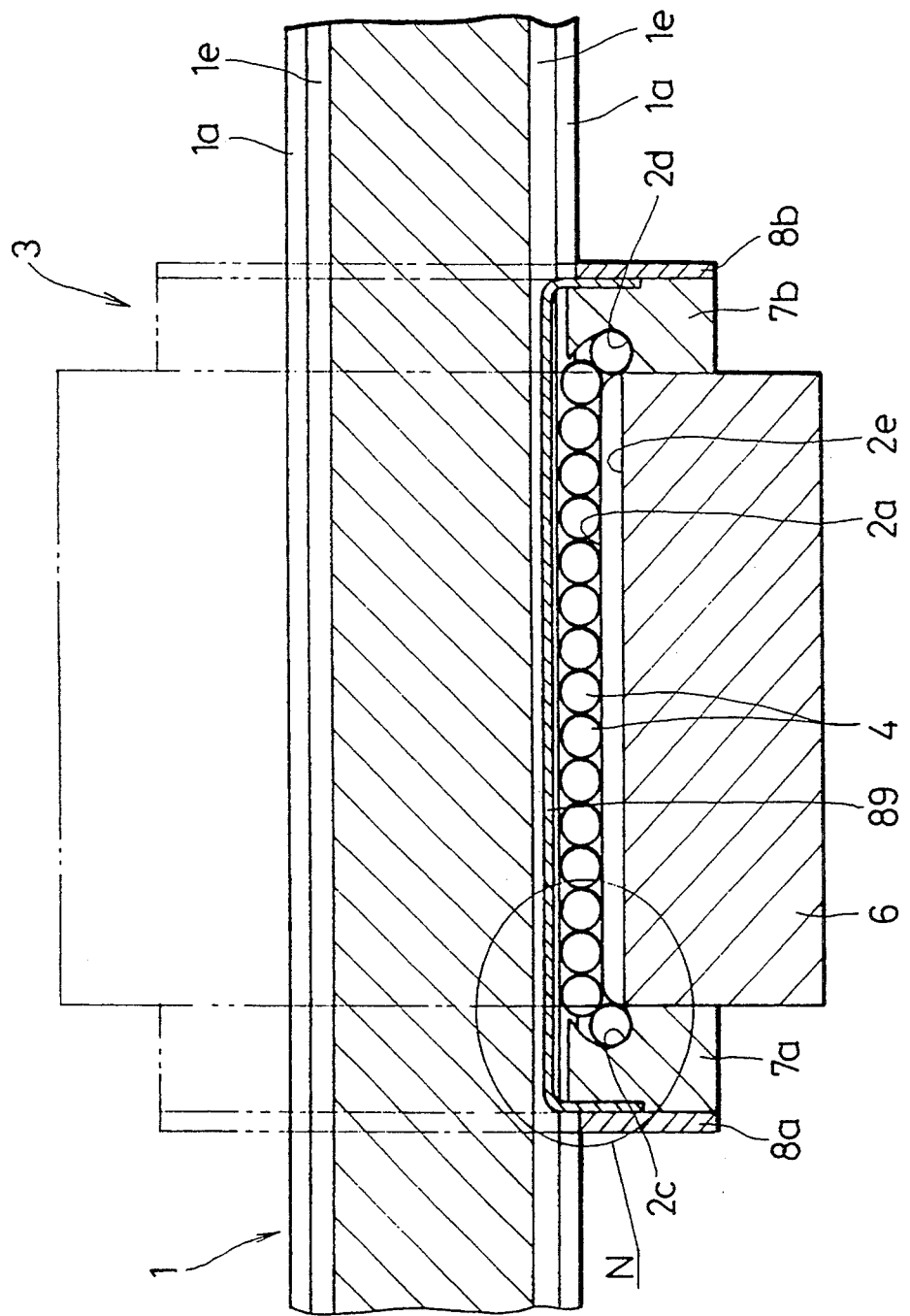
FIG. 24 is a top view, including a cross-section, of the essential portion of an eighth embodiment of the rolling guide unit of the present invention.
Figure 25:
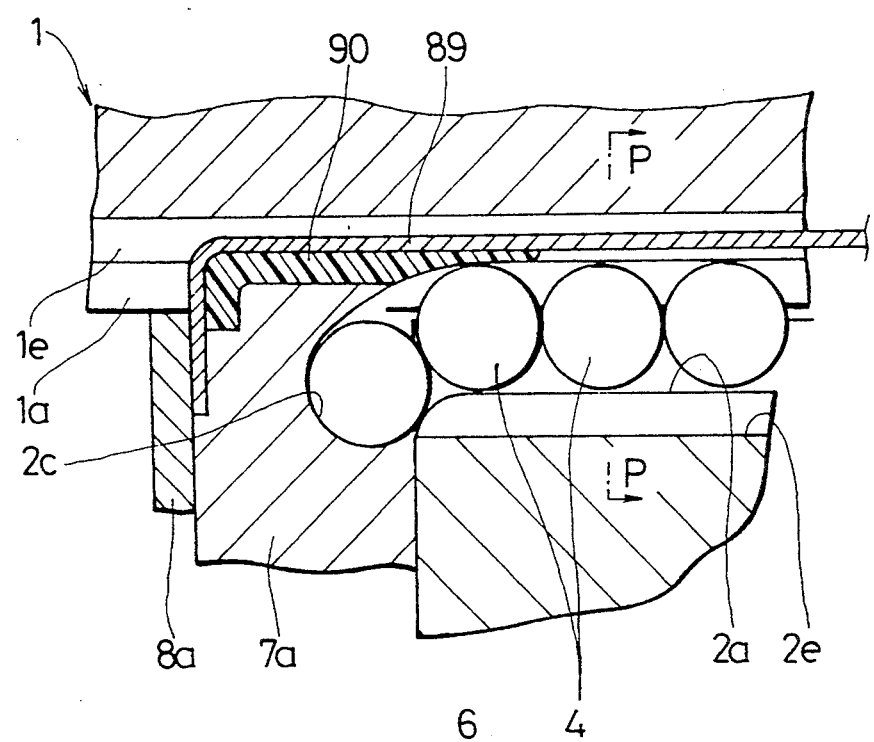
FIG. 25 is an enlarged view of portion N in FIG. 24.
Figure 26:
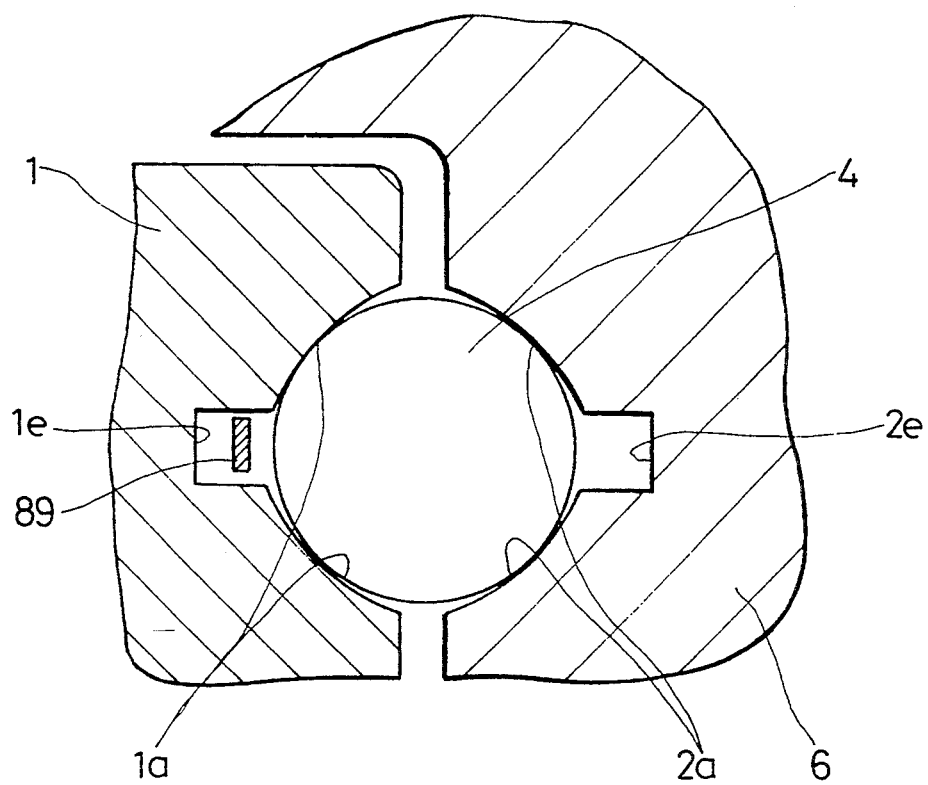
FIG. 26 is a cross-sectional view taken along line P—P with respect to FIG. 25.

Next, an explanation of an eighth embodiment of the rolling guide unit of the present invention is provided based on FIGS. 24 through 26. Furthermore, since said embodiment of the rolling guide unit is composed similar to the first embodiment of the rolling guide unit shown in FIGS. 3 through 7 with the exception of those portions explained below, the explanation will only focus on the essential portion with an overall explanation of the unit omitted. In addition, in the following explanation, the same reference numerals will be used for those constituent members which are identical to the constituent members of said first embodiment of the rolling guide unit.

As shown in FIGS. 24 through 26, in said rolling guide unit, retaining member 89 is provided so as to extend along load bearing track groove 2a of sliding unit 3. This retaining member 89 holds balls 4 so that they do no fall out of load bearing track groove 2a when sliding unit 3 is removed from track rail 1. More specifically, retaining member 89 is formed into the shape of a long narrow band made of steel and so forth, and is attached to sliding unit 3 at both its ends. Furthermore, as is particularly clear from FIGS. 25 and 26, retaining member 89 is suspended within grinding relief groove 1e formed along the bottom of track groove 1a for grinding of said track groove 1a of track rail 1.

FIG. 25 is an enlarged view of portion N in FIG. 24. As is clear from said drawing, elastic member 90, made of rubber, plastic and so forth, is fastened with adhesive and so forth to the inner surface of the above-mentioned retaining member 89. As a result of employing this constitution, the production of noise and vibrations is prevented since balls 4 do not collide with track groove 1a of track rail 1 when said balls 4 enter load bearing track groove 2a from direction changing path 2c.

Furthermore, although the above-mentioned elastic member 90 is provided so as to only correspond to the connecting portion of load bearing track groove 2a and direction changing path 2c (2d) and in its vicinity in the present embodiment, it may also be provided corresponding to the entire length of load bearing track groove 2a. However, providing elastic member 90 only corresponding to the connecting portion of load bearing track groove 2a and direction changing path 2c (2d) along with its vicinity offers the advantage described below.

Namely, at this portion, when balls 4 move between track groove 1a and load bearing track groove 2a from direction changing path 2c (2d), said balls 4 end up colliding with the track surface of track groove 1a resulting in the production of relatively high levels of noise. Accordingly, by arranging elastic member 90 at this portion only, not only will the production of noise be effectively inhibited, but sliding resistance will be reduced since balls 4 will roll without intervention by elastic members at other portions.

Figure 27:
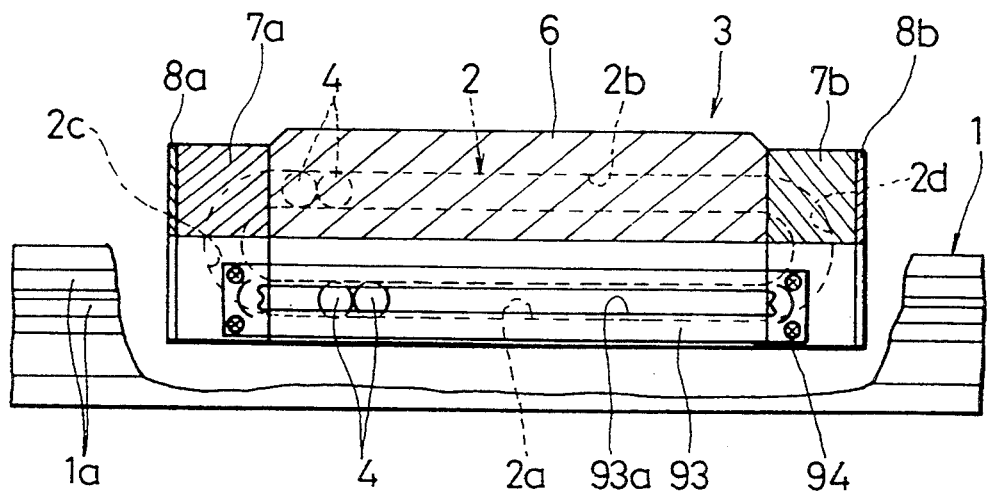
FIG. 27 is a front view, including a cross-section, of the essential portion of a ninth embodiment of the rolling guide unit of the present invention.
Figure 28:
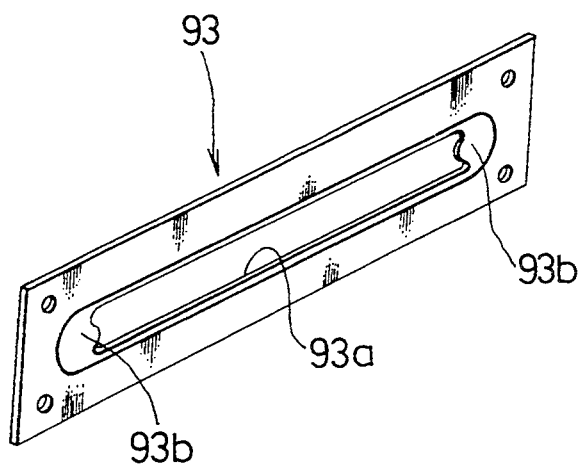
FIG. 28 is a perspective view of the retaining member equipped on the rolling guide unit shown in FIG. 27.
Figure 29:
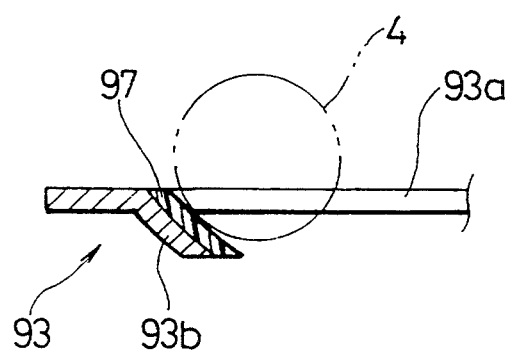
FIG. 29 is a cross-sectional view of the end of the retaining member shown in FIG. 28.

FIGS. 27 through 29 show a ninth embodiment of the rolling guide unit of the present invention. Furthermore, since said embodiment of the rolling guide unit is composed similar to the first embodiment of the rolling guide unit shown in FIGS. 3 through 7 with the exception of those portions explained below, the explanation will only focus on the essential portion with an overall explanation of the unit omitted. In addition, in the following explanation, the same reference numerals will be used for those constituent members which are identical to the constituent members of said first embodiment of the rolling guide unit.

As shown in FIG. 27, in said rolling guide unit, retaining member 93, provided so as to extend along load bearing track groove 2a of sliding unit 3, is formed to be in the shape of a long rectangular plate, and is fastened to the inner surface of sliding unit 3 by screws 94 at, for example, its four corners. This retaining member 93 holds balls 4 so that said balls 4 do not fall out of load bearing track groove 2a when sliding unit 3 is removed from track rail 1. As is clear from FIG. 28, the width is made to be smaller than the outer diameter, or diameter, of balls 4, while slit 93a is formed extending in the lengthwise direction to make sliding contact with balls 4 at its edges.

As is clear from FIGS. 28 and 29, rakes 93b are formed on both ends of the slit in the above-mentioned retaining member 93 to rake balls 4 rolling between track groove 1a of track rail 1 and load bearing track groove 2a of sliding unit 3 and feed them to direction changing paths 2c and 2d. As shown in FIG. 29, elastic member 97 is fastened with adhesive and so forth to said rake 93b to make contact with balls 4. This elastic member 97 is made of rubber or plastic.

As a result of providing the above-mentioned elastic member 97, in addition to balls 4 being prevented from directly colliding with rake 93b, said balls are also cushioned. In addition, the production of noise and vibrations is inhibited since balls 4 do not collide with track groove 1a of track rail 1 when said balls 4 move from direction changing path 2c (2d) to load bearing track groove 2a.

Figure 30:
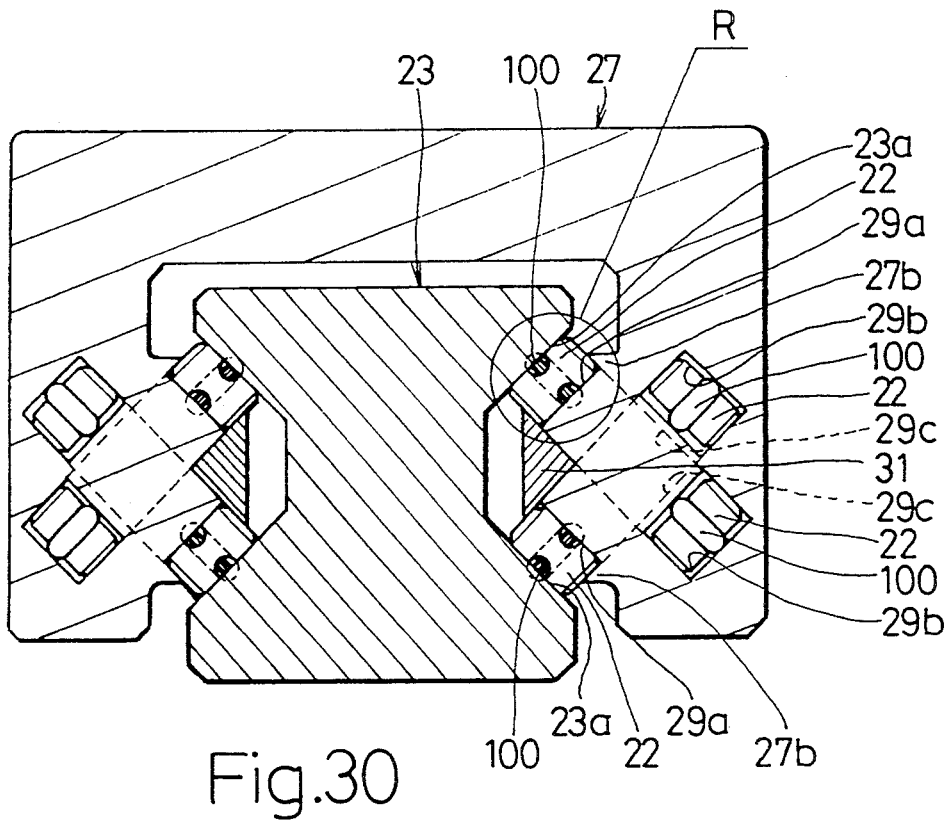
FIG. 30 is a vertical cross-sectional view of a tenth embodiment of the rolling guide unit of the present invention.
Figure 31:
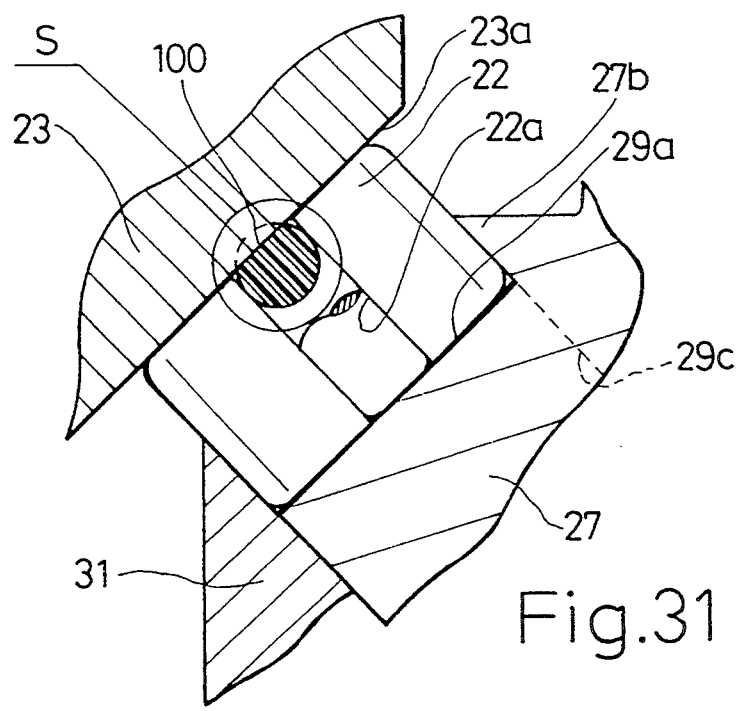
FIG. 31 is an enlarged view of portion R in FIG. 30.
Figure 32:
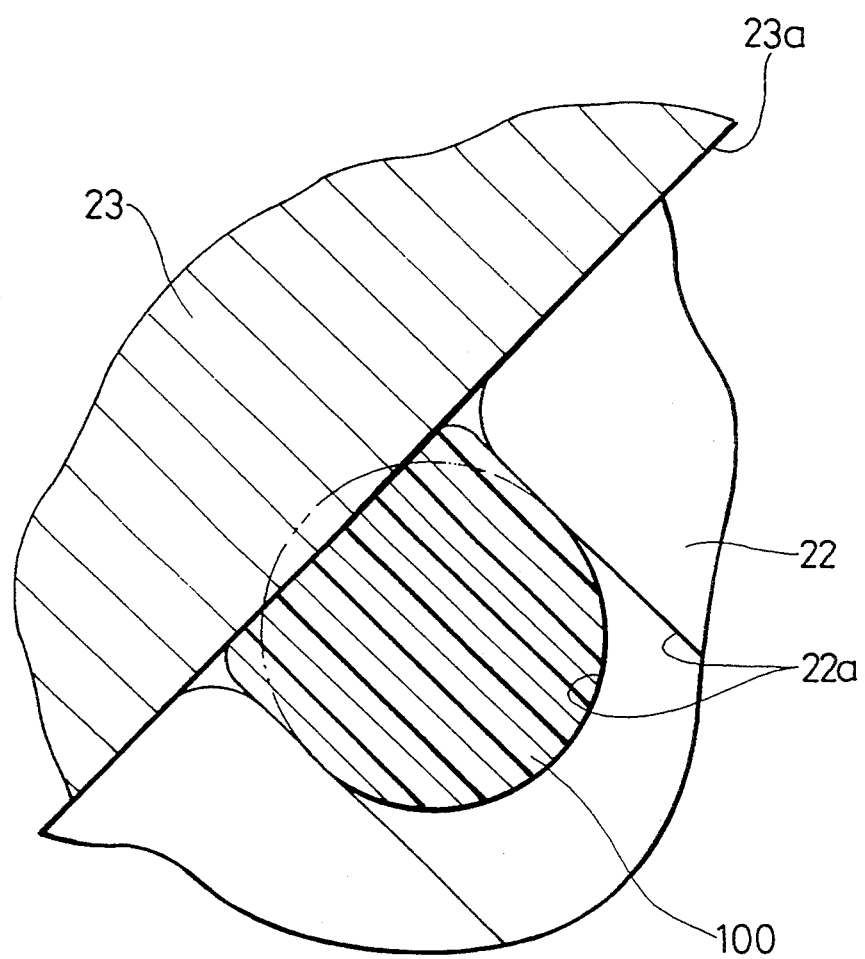
FIG. 32 is an enlarged view of portion S in FIG. 31.

The following provides an explanation of a tenth embodiment of the rolling guide unit of the present invention based on FIGS. 30 through 32. Furthermore, since said rolling guide unit is composed similar to the third embodiment of the rolling guide unit shown in FIGS. 14 through 16 with the exception of those portions explained below, the explanation will only focus on the essential portion with an overall explanation of the unit omitted. In addition, in the following explanation, the same reference numerals will be used for those constituent members which are identical or correspond to the constituent members of said third embodiment of the rolling guide unit. Furthermore, since said rolling guide unit is formed laterally symmetrically, reference numerals are only indicated for one side of said rolling guide unit to avoid complicating the drawing.

As shown in FIGS. 30 and 31, in said rolling guide unit, ring-shaped groove 22a is formed in the circumferential direction on the outside of roller 22. Elastic member 100, formed into the shape of a ring from rubber or plastic and so forth, is press fit into this ring-shaped groove 22a.

FIG. 32 shows an enlarged view of portion S in FIG. 31. As is clear from said drawing, the majority of elastic member 100 having, for example, a circular cross-section, fits into ring-shaped groove 22a of roller 22 while a portion protrudes as shown with the double dot broken line. Namely, when roller 22 rolls along track surface 23a and so forth, that protruding portion is elastically deformed as a result of contact with said track surface 23a and so forth. As a result of employing this constitution, the production of noise and vibrations is prevented in the same manner as each of the other embodiments previously described.

Furthermore, the above-mentioned elastic member 100 is arranged at the central position in the axial direction of roller 22. Roller 22 rolls smoothly due to said constitution.

Furthermore, the present invention is naturally not limited to the constitutions of each of the embodiments previously described, but rather any portion of two or more of the constitutions of each of these embodiments may be combined or mutually applied to realize a diverse range of other constitutions.

In addition, although each of the above-mentioned embodiments described the case of a linear rolling guide unit, embodiments may also be employed in which said rolling guide unit operates curvilinearly having a certain curvature.

As has been described above, according to the present invention, the cushioning action of an elastic member juxtapositioned at a suitable location offers the advantage of effective inhibition of the production of noise and vibrations.

What is claimed is:

1. A rolling guide unit equipped with an elongated track rail, in which a track is formed in the lengthwise direction of a lateral surface of said track rail, a slider straddled across said track rail and having a rolling element circulating path containing a load bearing track corresponding to said track, and which is able to move relative to said track rail, and a plurality of rolling elements arranged and contained in said rolling element circulating path that bear the load by circulating through said rolling element circulating path while rolling over said track; wherein, at least either an area proximate a portion of said track or said rolling element circulating path is provided with an elastic member which protrudes into a portion of said rolling element circulating path to be elastically deformed by said rolling elements when said rolling elements are in said portion of said rolling element circulating path.

2. The rolling guide unit as set forth in claim 1 wherein a portion of said elastic member is arranged near said track and/or rolling element circulating path to face said track or rolling element circulating path.

3. A rolling unit equipped with a track rail, in which tracks are formed in the lengthwise direction, a slider having a rolling element circulating path containing a load bearing track corresponding to said track, and which is able to move relative to said track rail, a plurality of rolling elements arranged and contained in said rolling element circulating path that bear the load by circulating while rolling over said track, and a retaining member attached to said slider while extending along said load bearing track that prevents said rolling elements from falling out of said load bearing track;

wherein, an elastic member is provided on said retaining member to as to make contact with said rolling elements, wherein said track has a track groove formed in a surface of said track which contacts said rolling elements, a grinding relief groove provided along the bottom of said track groove, and said retaining member being formed roughly into a band shape and suspended in said grinding relief groove.

4. The rolling guide unit as set forth in claim 3 wherein said-rolling element circulating path has said load bearing track, a roughly parallel return path and a direction changing path that connects said load bearing track and return path, and said elastic member is provided corresponding to at least the connecting portion of said load bearing track and direction changing path.

5. The rolling guide unit as set forth in claim 4 wherein said elastic member is provided only corresponding to the connecting portion of said load bearing track and direction changing path.

6. The rolling guide unit as set forth in claim 3 wherein said retaining member is formed into a long flat plate having a slit formed therein, the width of the slit being smaller than the external diameter of said rolling elements, the slit making sliding contact with said rolling elements at its edge and extending in the lengthwise direction of said retaining member.

* * * * *